United States Patent [19]

Beaudoin et al.

[11] Patent Number: 4,981,107
[45] Date of Patent: Jan. 1, 1991

[54] COMPUTERIZED AUTOMATIC CATTLE-FEEDER SYSTEM

[75] Inventors: Gaetan Beaudoin, Artabaska; Jacques Cimon, Levis, both of Canada

[73] Assignee: Micro-Contact Inc., Quebec, Canada

[21] Appl. No.: 331,174

[22] Filed: Mar. 31, 1989

[51] Int. Cl.⁵ ............................................... A01K 5/02
[52] U.S. Cl. ..................................... 119/56.2; 119/57.6
[58] Field of Search ..................... 119/56.1, 56.2, 57.5, 119/57.6, 57.7, 57.92

[56] References Cited

U.S. PATENT DOCUMENTS

| | | | |
|---|---|---|---|
| 3,587,529 | 6/1971 | Wienert et al. | 119/57.6 X |
| 4,027,628 | 6/1977 | Butler et al. | 119/57.6 |
| 4,119,193 | 10/1978 | Smith et al. | 119/57.7 X |
| 4,223,638 | 9/1980 | Sappington et al. | 119/57.6 |
| 4,672,917 | 6/1987 | Fox | 119/56.1 X |
| 4,782,790 | 11/1988 | Batson | 119/57.7 X |
| 4,811,675 | 3/1989 | Segalla | 119/57.6 |

FOREIGN PATENT DOCUMENTS

| | | | |
|---|---|---|---|
| 2639423 | 3/1977 | Fed. Rep. of Germany | 119/57.6 |
| 2807107 | 8/1979 | Fed. Rep. of Germany | 119/57.6 |
| 2495892 | 6/1982 | France | 119/57.6 |
| 2507435 | 12/1982 | France | 119/56.1 |
| 2605844 | 5/1988 | France | 119/57.6 |
| 0222480 | 5/1985 | German Democratic Rep. | 119/57.6 |
| 0420290 | 3/1974 | U.S.S.R. | 119/57.6 |
| 1055447 | 11/1983 | U.S.S.R. | 119/57.6 |
| 1347082 | 2/1974 | United Kingdom | 119/56.2 |

Primary Examiner—Robert P. Swiatek
Assistant Examiner—Todd E. Manahan
Attorney, Agent, or Firm—Foley & Lardner, Schwartz, Jeffery, Schwaab, Mack, Blumenthal & Evans

[57] ABSTRACT

There is disclosed a computerized automatic feeder system for feeding individualized prescribed rations to cattle confined in successive individual stalls aligned along a set path. The system comprises an apparatus capable of moving to each stall successively and having appropriate devices for preparing, at each stall, an individualized ratio for the cattle head in that stall and delivering it to the animal. A computer is mounted on the apparatus for controlling the operations of moving the apparatus to the stalls and preparing and delivering the rations.

17 Claims, 8 Drawing Sheets

COMPUTERIZED AUTOMATIC CATTLE-FEEDER SYSTEM

BACKGROUND OF THE INVENTION

1. FIELD OF THE INVENTION

The present invention relates to a fully computerized and automatic feeder system for feeding cattle heads.

2. DESCRIPTION OF THE PRIOR ART

As is known, in a barn each cattle head is confined in a stall with all the stalls being positioned successively along, and usually on both sides of a path of predetermined layout. At meal time, the cattle attendant moves along the path with a generally semi-automatic wheeled apparatus with which he may prepare, as he comes to each cattle position, a feeding ration especially prescribed for the animal in the particular stall at which the apparatus is stopped. When prepared, the attendant delivers the ration to the animal. The rations consist of standard cattle foods to which is often added at least one other ingredient.

As is also known, this is a tedious and time-consuming operation as well as a fairly costly one as it requires the presence of the attendant at each meal time of the day and every day.

SUMMARY OF THE INVENTION

An object of the present invention lies in the provision of a feeder system which is fully computerized and automatic so that it may feed, at appropriate times, all of the cattle in a barn with rations especially prescribed for each animal and without the presence of an attendant thereby resulting in an important reduction of working hours and therefore of the costs. The system affords also a higher quality of life since the attendant, most often the cattle owner, may thus free himself from this particular chore.

Yet an other object of the invention resides in the provision of a feeder system which, because it is fully computerized, affords a better management of the cattle by more accurate control over its food requirements resulting in a lower food cost, an increase in milk production in the case of dairy cows and, generally, a better health of the cattle.

More specifically, the invention is a computerized automatic feeder system intended for feeding prescribed individualized rations to cattle heads confined in successive individual positions aligned along a predetermined path. The system according to the invention comprises a ration preparing and distributing apparatus with means for moving it along the path and successively to each cattle position. The apparatus contains means capable of preparing individualized rations, each intended for one cattle head only. The apparatus also contains means delivering the rations to each animal when it stands at the animal's particular location along the path. Finally, the system includes computerized means capable of ensuring sequential operation of the other means in the system.

In a preferred form, the ration-preparing means includes a first hopper which defines two independent compartments each containing one particular ration ingredients; each compartment having, at its bottom, a first device for discharging the ingredients contained therein. The delivery means, on the other end, comprise a first endless conveyor which is disposed for receiving the ingredients from the first hopper and for delivering them as rations out of the apparatus.

Preferably, the ration preparing means comprise a balance means in operative contact with the upper strand of an endless conveyor for controlling, through the computer means, the quantity of ration ingredients received from the hopper compartments.

Other features, advantages and objects of the invention will become apparent from the description that follows of a preferred embodiment having reference to the appended drawings.

DESCRIPTION OF THE PREFERRED EMBODIMENTS

According to the embodiment shown in FIGS. 1 to 5, the cattle feeding system comprises an apparatus 1, capable of preparing and distributing individualized prescribed rations to the animals to be fed;

a computer 3 removably mounted as a module at the front end of the apparatus 1, and a drive assembly 5 (FIGS. 9 and 11) suitable to move the apparatus from a START position in the barn, successively to the other positions where the cattle heads are respectively confined, that is, in individual stalls aligned in a path of predetermined layout; the stalls being usually located on either side of the path.

As fully described hereinafter, the apparatus 1 contains means for preparing the individualized rations and further means for delivering the rations to the cattle heads when the apparatus reaches the successive stalls; the suitably programmed computer 3 ensuring that the apparatus 1 moves successively to each stall and, at each stall, that it prepares and delivers the prescribed ration that is intended for the particular animal in the stall.

FIGS. 1 to 5 show, as part of the means for preparing individual rations, the apparatus 1 to be formed of a central first hopper 7 capable of handling two ingredients, intended to form a ration, and to the front wall 9 of which hopper, the computer 3 is removably secured, as a module.

Integral with the lower end of the first hopper 7 is a base 11 extending forwardly and laterally, In FIGS. 1 to 5, the base 11 is enclosed by a generally U-shaped removable cover and it contains a first endless conveyor 13 (FIG. 6) as means for delivering the rations. Laterally of the first hopper 7, the base includes batteries 15 and housings 17 on either side of the hopper 7, only one being shown; the batteries serving to supply the system with electrical energy thereby rendering it fully autonomous.

The first hopper 7 defines, by means of a central partition wall 19 extending lengthwise of the apparatus 1 (FIG. 8), two independent compartments 21,21' for containing two different ration ingredients, one in each compartment. The compartments have, at their bottoms 23, 23', first discharging devices, here in the form of a pair of identical parallel endless or worm-screws 25,25', intended to discharge the components onto the endless conveyor 13 through short discharge conduits 27,27' (FIGS. 6 and 7) at the lower end of hopper 7. It has been found more efficient to give the hopper bottom a polygonal shape shown in FIG. 8, rather than an arcuate one, that is a bottom formed of a straight horizontal portion joined by two straight upwardly inclined portions.

Figure 6:
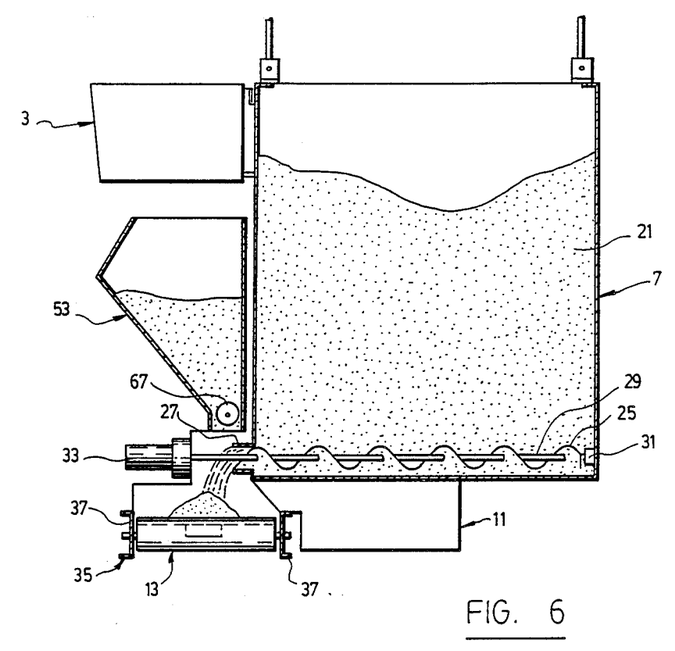
FIG. 6 is a diagrammatic view similar to that in FIG. 2 with some of the casing covers removed to show part of inner structure.
Figure 7:
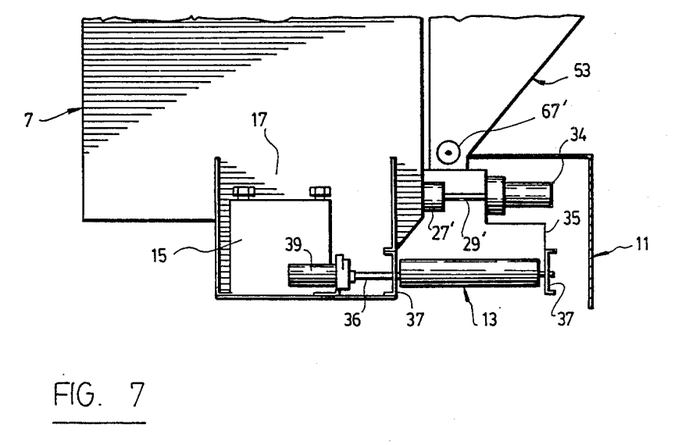
FIG. 7 is a diagrammatic elevation view of the lower portion of the other side of the apparatus also with some of the casing covers removed to show part of the inner structure.
Figure 8:
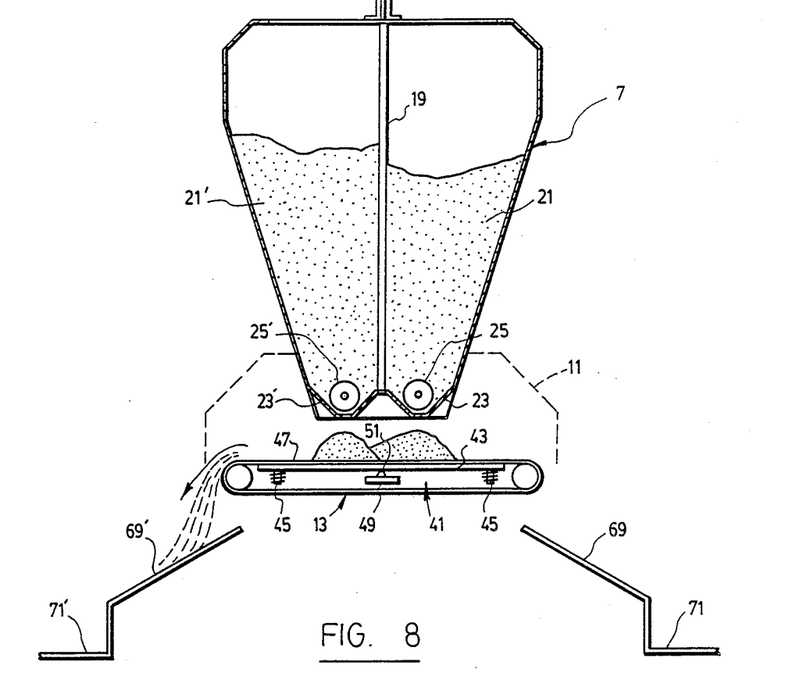
FIG. 8 is a diagrammatic front elevation view, with front covers removed and partly in cross-section

As best shown in FIG. 6, the worm-screw 25 has a central axle 29 of which one end is journalled in a bearing 31, fixed to the rear wall of the hopper 7, and the other end is operatively connected to the output of a speed reducer of an electric motor assembly 33 mounted on the frame 35 of the base 11. The motor assembly 33 is energized by one of the batteries 15 through conventional connections. A similar description is valid for the worm-screw 25' of the hopper compartment 21' (FIG. 8) driven by an electric motor assembly 34 through a central axle 29' (FIG. 7). It will be noted that the discharge conduits 27,27', unload the ingredients at about the center of the endless conveyor 13. The latter is mounted for rotation, at its ends, on two rollers of which the axles rotate on a pair of transverse beams 37 of the frame 35 (FIG. 6). One of the roller axles 36 is a driving axle for the belt of the conveyor 13 and is driven into rotation by a motor assembly such as 39 (FIG. 7) located in the housing 17 and energized by the battery 15 therein. Motor assembly 39 includes conventional means allowing selective rotation, controlled through the computer 3, of the roller driving axle 36 and thus of the endless belt of the conveyor 13 in either one of the directions of rotation to allow delivery of the rations on one side or the other of the path followed by the apparatus 1. The rations fall on ramps 69, 69' leading into feeding troughs 71, 71', along the path followed by the apparatus. In the variant of FIGS. 6 and 8, the worm-screws are parallel and extend lengthwise of the said path.

The means to prepare the prescribed rations further include a first weighing balance 41 of any known type suitable to measure with accuracy, the quantity of each of the two ingredients composing a prescribed ration and falling from each compartment 21,21'. In FIG. 8, the balance 41 essentially comprises a flat scale 43 mounted on return springs 45 so that, in unloaded condition, it barely touches the undersurface of the upper strand 47 belt of the endless conveyor 13. Located centrally of the strand 47, is an electronic sensor device 49, operatively connected to the computer 3 and having a sensing stud 51 in contact with the strand 47. As will be gathered, rotation of the worm-screw 25 discharges the ingredient in the hopper compartment 21, on the upper strand 47 which flexes downwardly and presses on the sensing stud 51. Once the prescribed amount has fallen, the sensor device 49 orders, through the computer 3, stopping of the motor 33 and thus of the worm-screw 25 and actuation of the other worm-screw 25'. The latter will rotate until the right quantity of the ingredient in the hopper compartment 21' has been discharged and the ration is ready to be delivered by the conveyor 13 and thence on one of the ramps 69,69', and into the corresponding one of the throughs 71,71'.

Figure 1:
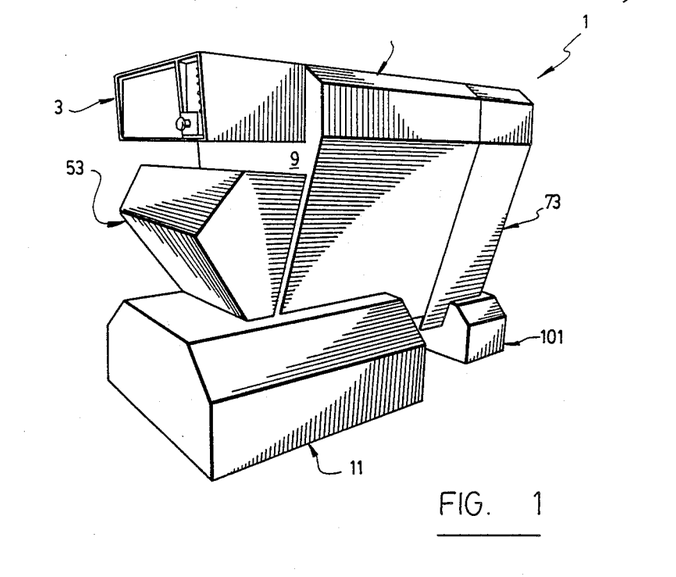
FIG. 1 is a perspective view.
Figure 2:
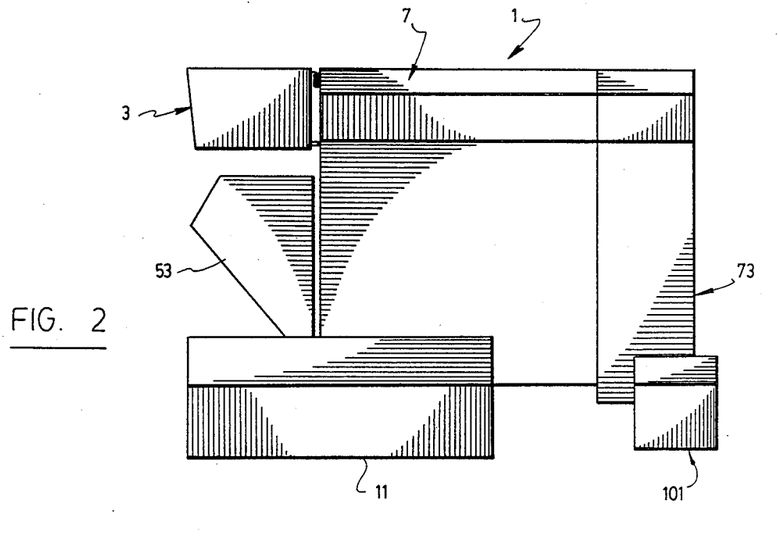
FIG. 2 is a side elevation view.
Figure 3:
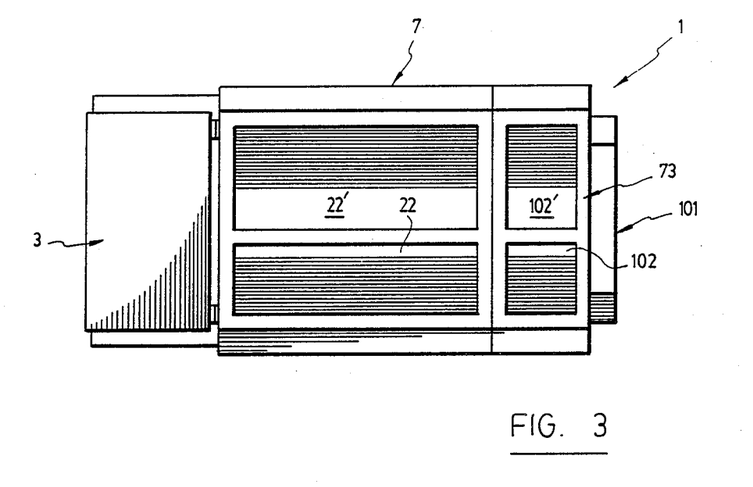
FIG. 3 a top plan view.
Figure 4:
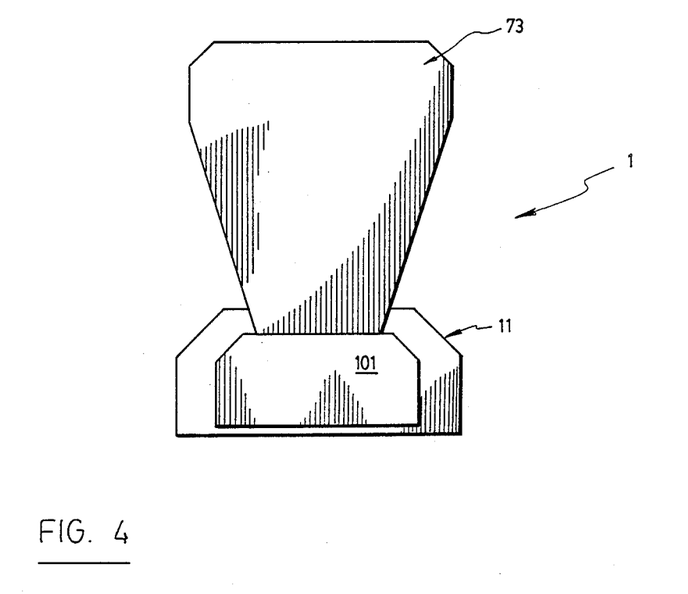
FIG. 4 a rear elevation view.
Figure 5:
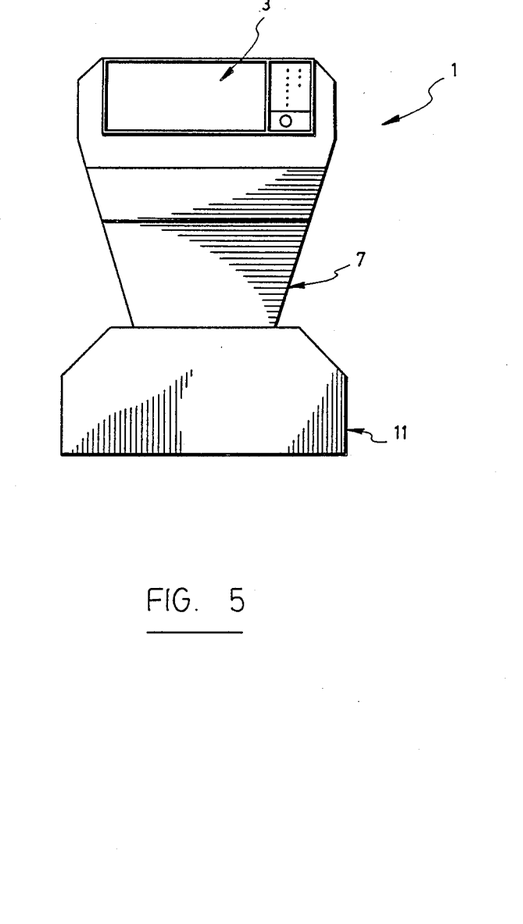
FIG. 5 a front elevation view of the movable apparatus of a feeder system according to the invention.

FIG. 3 shows that the compartments 21, 21', of the first hopper 7 have openings 22, 22', at the top for the loading of ingredients. They may be suitably closed by flat hinged covers (not shown).

The system which has just been described is suitable when food and/or health rations are made up of only two different ingredients. Where more than two ingredients are involved, say four, the invention proposes the addition of a second hopper 53 shown diagrammatically in FIG. 10 and capable of handling two further ingredients. As can be seen from this figure, the second hopper is functionally the same as the first hopper 7 but structurally slightly different.

Figure 10:
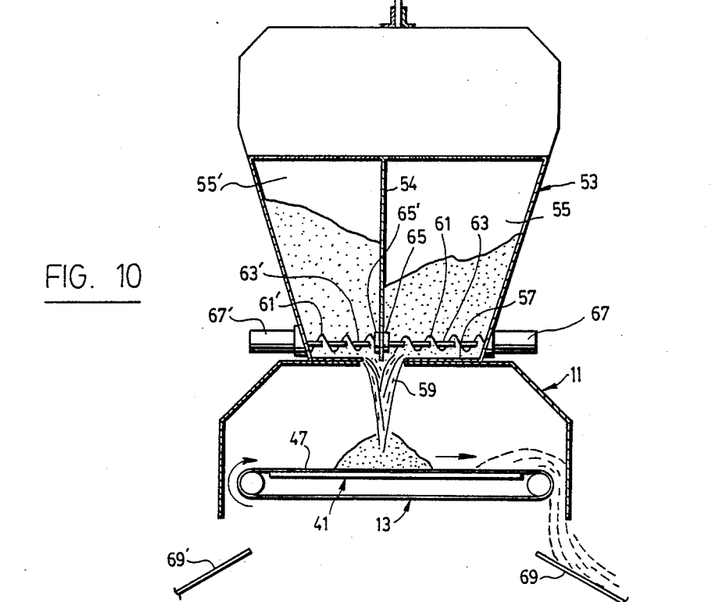
FIG. 10 is a view similar to that in FIG. 8 but with the addition of a second hopper mounted at the front of the first one.

Like the first hopper, it is a self-contained unit or module and as such can be appropriately removably mounted on the front wall 9 of the first hopper, above the first conveyor 13 and below the also removable computer module 3. This second conveyor 53 is divided, by a partition wall 54, into two independent compartments 55, 55', for containing the two additional ration ingredients. The two compartments have a common bottom wall 57 formed with a common outlet aperture 59, beneath the partition wall 54 and registering with a like aperture through the cover of the base 11 so that ingredients may fall on the upper strand 47 of the belt of the conveyor 13. Two coaxial transverse worm-screws 61,61', carry the ingredients to the outlet aperture 59. They have axles 63, 63', rotating at one end in central bearings 65,65', and operatively connected at the other end to motor assemblies 67,67', of which the motors are energized by one of the batteries 15; the motor assemblies being also controlled through the computer 3. Operation of the conveyor 13 is, as said before, controlled for selective delivery of the rations on either one of the ramps 69, 69', and into the relevant one of troughs 71,71'.

Figure 12:
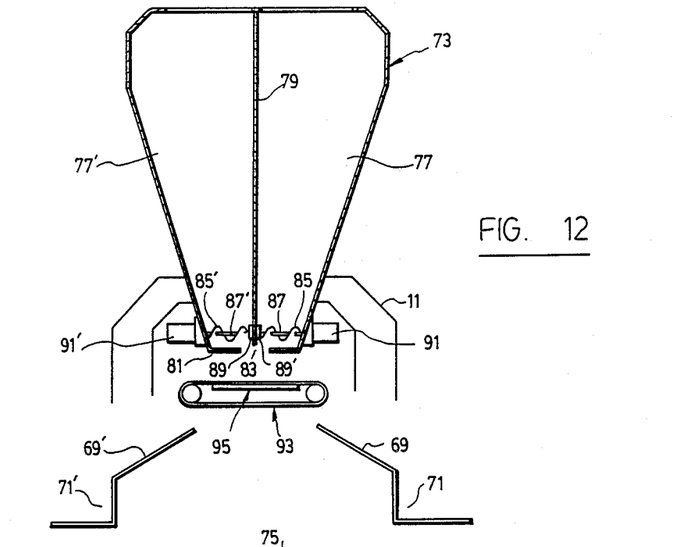
FIG. 12 is a rear view, in elevation, of the apparatus shown equipped with a third hopper mounted at the rear of the first hopper.
Figure 13:
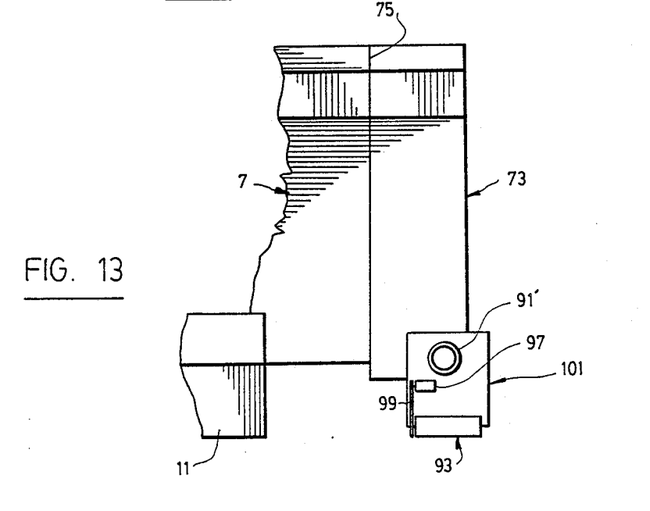
FIG. 13 is side elevation view of the rear end of the apparatus and including a third hopper and a second endless conveyor.

FIGS. 12 and 13 diagrammatically show the possible addition of a third two-ingredient hopper 73 similar to the second hopper 53 and removably mounted, as a module, on the back wall 75 of the first hopper 7, as a further part of the ration-preparing means. Like the second hopper 53, it is divided into two compartments 77, 77', by a partition wall 79 and its bottom wall 81 defines a common outlet aperture 83 for the exit of the ingredients which are moved by two coaxial worm-screws 85, 85', of which the axles 87, 87', are born by bearings 89,89', of the partition wall 79 and coupled with driving motor assemblies 91, 91'.

The ingredients fall on a second endless delivery conveyor 93 having a weighing balance 95 which may be of the same kind as the first balance 41. The conveyor 93 is driven by a battery-operated motor assembly 97 (FIG. 13) through a chain drive 99. The conveyor 93, balance 95, motor assembly 97 and chain drive 99 are preferably mounted on a frame (not shown) made solid with the lower end of the hopper 73 so as to make up a unit 101 forming, with the hopper 73, a module capable of being used as an option.

The two additional ingredients fall from the conveyor 93 on either one of the ramps 69, 69', and thence on the relevant one of the feeding troughs 71. This assumes that the apparatus 1 has to be moved a distance equal to that between the two conveyors 13 and 93 after the first and second hoppers 7 and 53 have supplied the first four ingredients.

The ingredients are loaded into the compartments 77,77', through top filling openings 102, 102' (FIG. 3).

Figure 9:
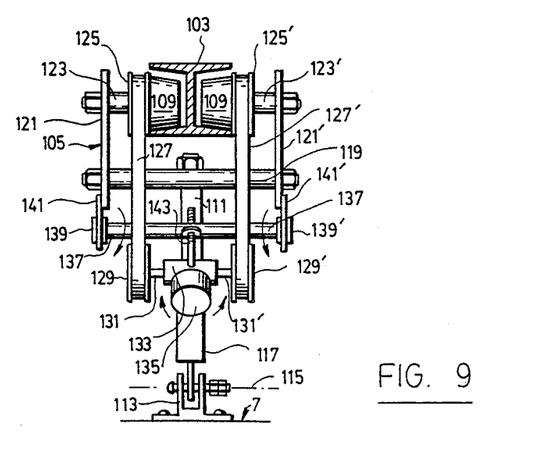
FIG. 9 is cross-sectional view taken along line X-IX of FIG. 11.
Figure 11:
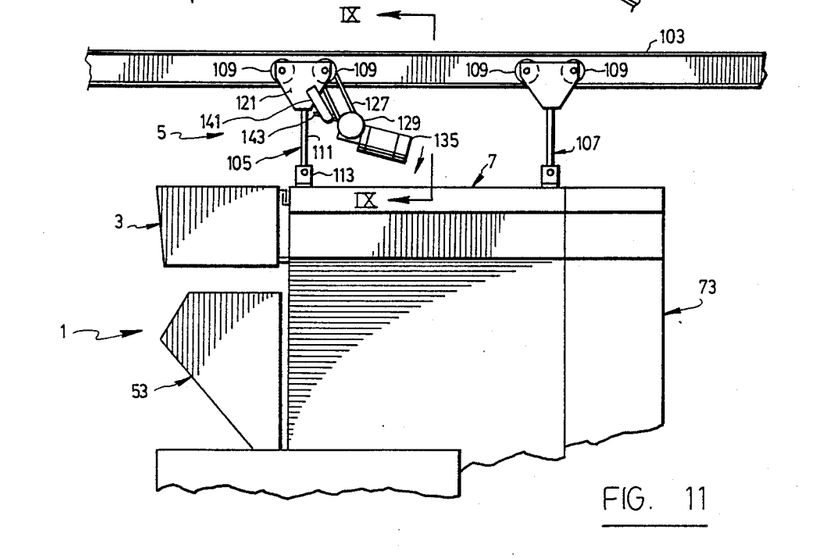
FIG. 11 is a side elevation view of the apparatus equipped with a drive assembly for moving along the feeding path.

Reference is now made to FIGS. 9 and 11 which illustrate the means or drive assembly 5 for moving the apparatus 1 along the path of the stalls.

As shown, the apparatus is mounted on a H beam 103 which extends along the path of the stalls. The apparatus 1 is suspended above the ground by a pair of carriers 105, 107, mounted at one end to the top of the first hopper 7, one behind the other according to the direction of the path and, on the beam 103, through rollers 109.

The forward carrier 105 has a suspension rod 111 mounted at one end on a bracket 113, fixed to the top of the first carrier 107, for pivotal movement about an axis 115 transverse to the beam 103. The suspension rod 111 includes a turnbuckle 117 for adjusting the height of the apparatus 1. The other end of the rod is secured to a transverse bar 119 (FIG. 9) of which the ends are fixed to a pair of parallel cheek plates 121, 121'.

The rollers 109 are mounted for free rotation, by pairs, on the lower flange of the beam 103. For that purpose, they are connected, by appropriate supports 123, 123' (FIG. 9), to the cheek plates 121 above the transverse bar 119. As noted, two of the rollers 109 are integrally formed laterally with pulleys 125, 125'.

The latter are part of two belt drives including two endless belts 127, 127', winding around the roller pulleys 125, 125' at one end and two drive pulleys 129, 129' at the other end. The latter are fixed to the ends of stud drive shafts 131, 131', of which the other ends are coupled to a motor assembly. The latter includes a differential 133 to which the drive shafts 131, 131' are coupled. The differential is, in turn, operatively connected to the output shaft (not shown) of an electric motor 135.

The motor assembly and belt drives are mounted on the cheek plates 121, 121', for oscillation about two axes extending respectively lengthwise and crosswise of the beam 103. For this purpose, a supporting shaft 137 is rotated, at its ends, into bearings 139, 139', provided at the free ends of two metal straps 141, 141', secured to the cheek plates 121, 121' so that the said shaft 137 may rotate about an axis extending crosswise of the beam 103, as clearly shown by the arrows in FIG. 9. A supporting arm 143 is also provided which is fixed, at one end, to the top of the differential 133 while its other end is mounted on and kept at a fixed distance from the supporting shaft 137 for oscillation about a lengthwise axis which is the longitudinal axis of the said arm 143.

With such an arrangement, and reference being had to FIG. 11, it will be appreciated that the motor 135 overhangs, by its supporting arm 143, from the supporting shaft 137 so that it is biased downwardly by its weight, thereby automatically and continuously tightening the drive belts 127, 127', between the pulleys 125, 125'-129, 129'. On the other hand, the motor assembly 131, 131', 133-135, and the belt drives 127, 129, are free to oscillate, as shown by the arrow on motor 135, by virtue of its rotatable mount on the transverse shaft 137. In this manner, the motor assemby and belt drives are made tiltable about a lengthwise axis to ensure perfect distribution of the motor strength on the belts 127,127'.

The rearward carrier 107, in FIG. 11, is of the same construction as the forward carrier 105 except that it is not, nor need it be, provided with roller drive means.

Finally, the apparatus is provided with means, not shown, allowing it to be connected to a standard power line, after each cycle of operations, in order to recharge the batteries.

Figure 14:
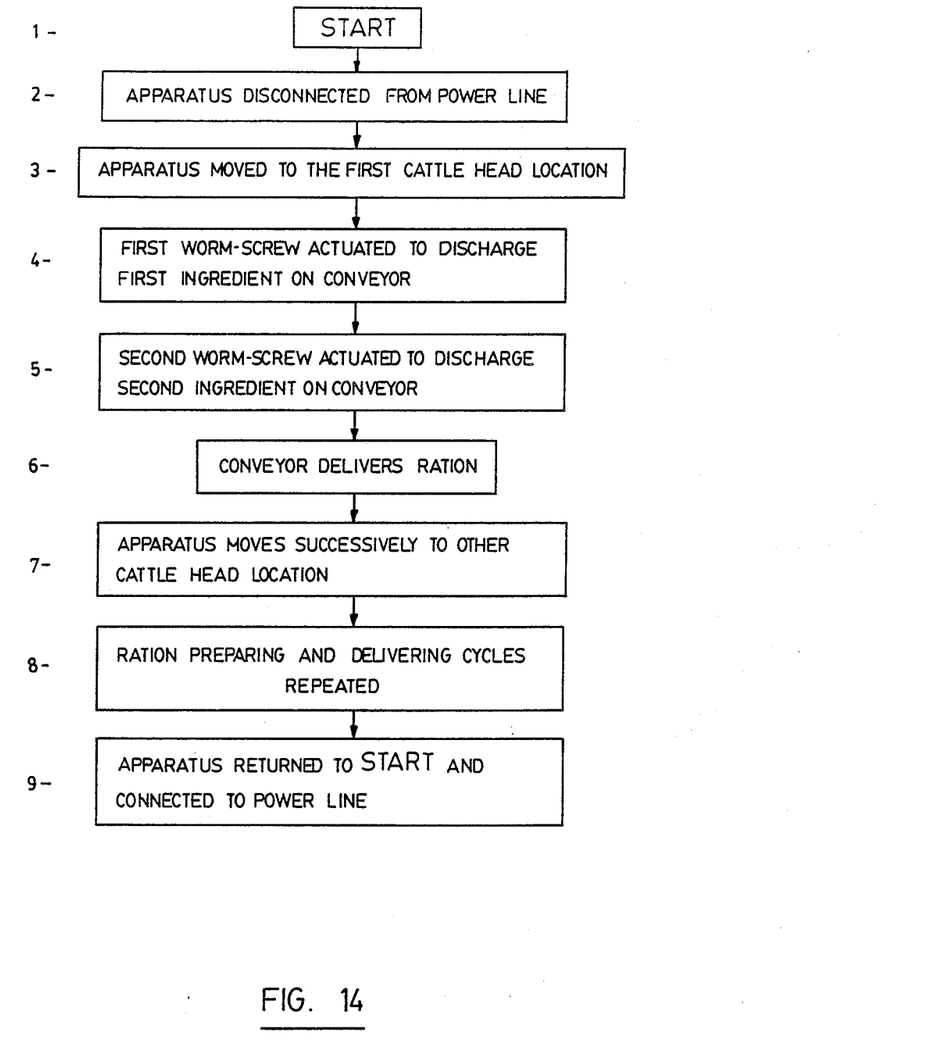
FIG. 14 is an operational block diagram of the feeder system according to the invention.

Reference is now made to FIG. 14 which is a diagram showing the sequence of operations carried out by the feeder system in the case where the apparatus 1 is constructed for the distribution of rations having only two ingredients, that is where the apparatus 1 has only the central hopper 7.

At the time prescribed for feeding the cattle, a timing device within the computer 3 instructs the latter to release the apparatus 1 from the power line and to actuate the driving assembly 5 (FIG. 11) which moves tha apparatus to the first cattle head stall. At that location, the driving assembly is stopped in response to a signal from a detection device identifying either the animal or the stall. It is advantageous that the device be carried by the animal rather than be fixed to the stall a this allows the animal to be moved to any other location along the path. Indeed, the signal in both cases sets the apparatus 1 into action, through the computer program, for preparing the ration appropriate for the identified animal.

Accordingly, the motor assembly (33 or 34) of one of the first worm-screws 25, 25' in the first hopper 7, is actuated and the first ingredient falls on the endless conveyor 13. Once the right quantity has dropped, the electronic balance 41 signals the computer to stop the rotation of the worm-screw and to cause the rotation of the other one which then discharges the prescribed quantity of the second ingredient on the endless conveyor 13. When the right quantity of ingredients has fallen, the electronic balance causes, through the computer 13, the worm-screw to stop and the conveyor to deliver the ration on one of the ramps 69,69' and the respective feeding trough 71,71'. Once the feeding operation is over, the computer orders the driving assembly 5 to move the apparatus 1 to the next animal along the path and the ration preparing and delivering operation is repeated for the particular animal at that next location.

After all the animals have been given their individual prescribed ration, the computer orders the drive assembly 5 to move the apparatus 1 back to start position and connects it to the power line for reloading the batteries.

Where some or all of the prescribed rations are more complex and involve three to six ingredients, the hopper 53 and, if needed, the hopper 73 are mounted on the hopper 7. The rations are prepared and delivered in the same manner as above described after the computer program has been modified to take the additional operation of the hoppers 53 and 73 into account.

The embodiments of the invention in which an exclusive property or privilege is claimed are defined as follows:

1. A computerized automatic cattle feeder system for feeding individualized prescribed portions to cattle heads confined in successive individual positions aligned along a predetermined path, said feeder system comprising:

a ration preparing and distributing apparatus;

means for moving said apparatus along said path successively to each of said positions;

in said apparatus, means capable of preparing individualized rations, each of said rations being intended for one of said cattle heads and prepared when said apparatus reaches said individual positions; and means in said apparatus for delivering said prepared rations at said positions, and computer means for ensuring sequential operation of said moving means, said ration preparing means and said ration delivering means;

said ration-preparing means comprising a first hopper defining two independent compartments for containing two different ration ingredients, one in each compartment; each compartment having a bottom, and, at said bottom, a first device for discharging the ration ingredients contained therein;

said delivering means comprising a first endless conveyor disposed for receiving said ration ingredients from said first hopper and for delivering said rations out of said apparatus for feeding said cattle heads; and said apparatus-moving means comprising:

an overhead beam extending along said path;

a pair of carriers mounted at one end on top of said first hopper, one behind the other in the direction of said path; said carriers having rollers mounted on said beam for allowing movement of said carriers and of said apparatus along said beam;

a pair of belt drives on one of said carriers operatively connected to two drive rollers of said one carrier, said drive rollers being spaced from one another across said beam;

motor means connected to said belt drives to actuate said drives; and support means mounting said motor means on said one carrier for allowing oscillation of said motor means and of said belt drives about two axes extending respectively lengthwise and crosswise of said beam.

2. A system as claimed in claim 1, wherein said first endless conveyor has an upper and a lower strand and said ration-preparing means further comprise:

first balance means in operative contact with said upper strand for controlling, through said computer means, the quantity of ration ingredients received from said first hopper compartments.

3. A system as claimed in claim 1, wherein said first discharging devices are parallel rotary worm-screws.

4. A system as claimed in claim 3, wherein said worm-screws extend in the direction of said predetermined path and said first endless conveyor extends transversely of said direction for delivering said rations out of said apparatus.

5. A system as claimed in claim 4, wherein said first endless conveyor has an upper and a lower strand and said ration-preparing means further comprise:

first balance means in operative contact with said upper strand for controlling, through said computer means, the quantity of ration ingredients received from said first hopper compartments.

6. A system as claimed in claim 5, wherein said ration-preparing means further comprise: a second hopper removably mounted as a modular unit on said first hopper above said first endless conveyor; said second hopper being divided into two independent compartments for containing two different ration ingredients, one in each compartment; said compartments having a common outlet opening at the center of said second hopper, at the bottom thereof and above said first endless conveyor; and said second hopper having two second coaxial rotary worm-screws mounted at the bottom of said compartments transversely of said path for moving said ration ingredients out through said common outlet opening and onto said first endless conveyor.

7. A system as claimed in claim 6, wherein: said ration-preparing means further comprise a third hopper removably mounted as a modular unit on said first hopper at the end thereof away from said second hopper; said third hopper being divided into two independent compartments for containing two different ration ingredients, one in each compartment, said compartments having a common outlet opening at the center of said third hopper and at the bottom thereof, said third hopper further having a pair of third coaxial rotary worm-screws mounted at the bottom of said compartments transversely of said path for moving said ration ingredients out through said common outlet opening of said third hopper, and said delivering means further comprise: a second endless conveyor disposed for receiving said ration components from said third hopper and for delivering said ration components out of said apparatus for feeding said cattle heads, said second conveyor being attached said third hopper.

8. A system as claimed in claim 7, wherein said second endless conveyor has an upper and a lower strand and said ration-preparing means further comprise:

second balance means in operative contact with said upper strand of said second conveyor for controlling, through said computer means, the quantity of ration ingredients received from said third compartments.

9. A system as claimed in claim 8, wherein said computer means are removably mounted on said first hopper, above said first endless conveyor.

10. A system as claimed in claim 7, including a central vertical partition wall in the said third hopper dividing said third hopper in said third hopper compartments, said third coaxial worm-screws being each mounted in one of said third hopper compartments normal to said partition wall.

11. A system as claimed in claim 6, wherein said computer means are removably mounted on said first hopper, above said first endless conveyor.

12. A system as claimed in claim 6, including a central vertical partition wall in said second hopper dividing said second hopper in said two second hopper compartments, said second coaxial worm-screws being each mounted in one of said second hopper compartments normal to said partition wall.

13. A system as claimed in claim 3, including a central vertical partition wall in said first hopper dividing said first hopper into said two first hopper compartments, said parallel worm screws being disposed adjacent one another on either side of said partition wall.

14. A system as claimed in claim 1, wherein said computer means are removably mounted on said first hopper, above said first endless conveyor.

15. A system as claimed in claim 14, further comprising battery means mounted on said first hopper for supplying operating current to said apparatus-moving means, to said ration-preparing means, to said ration-delivering means and to said computer means, whereby to render said apparatus completely energy autonomous.

16. A system as claimed in claim 1, wherein said one carrier has a pair of cheek plates with each of said two drive rollers being rotatably mounted on one of said plates and wherein said support means comprise:

a supporting shaft mounted, at the ends thereof, on said cheek plates for oscillation about said crosswise axis, and a supporting arm fixed at one end to said motor means and mounted, at the other end, on said supporting shaft for oscillation about said lengthwise axis.

17. A system as claimed in claim 16, wherein:

each of said belt drives comprises a pulley and a belt, said belt winding respectively about one of said drive rollers and about said pulley, and said motor means comprise a motor having an output shaft coaxial with said lengthwise axis; crosswise drive shafts operatively connected at one end to said pulleys, and a differential operatively joining said shafts for rotating said pulleys.

* * * * *